United States Patent [19]
Nakano

[11] Patent Number: 5,131,296
[45] Date of Patent: Jul. 21, 1992

[54] TRACTION DRIVE TRANSMISSION AND LOCK-UP CONTROL

[75] Inventor: Masaki Nakano, Kawasaki, Japan

[73] Assignee: Nissan Motor Co., Ltd., Yokohama, Japan

[21] Appl. No.: 731,765

[22] Filed: Jul. 18, 1991

[30] Foreign Application Priority Data

Jul. 18, 1990 [JP] Japan .................. 2-189957

[51] Int. Cl.⁵ ............................. F16H 59/06
[52] U.S. Cl. ..................................... 74/868
[58] Field of Search ...................... 74/867, 868

[56] References Cited

U.S. PATENT DOCUMENTS

| 4,367,812 | 1/1983 | Kobayashi et al. | 192/3.3 |
|---|---|---|---|
| 4,595,088 | 6/1986 | Sugano | 192/0.076 |
| 4,790,216 | 12/1988 | Eggert et al. | 74/866 |
| 4,843,920 | 7/1989 | Hayasaki | 74/869 |
| 4,890,516 | 1/1990 | Suzuki | 74/866 |

FOREIGN PATENT DOCUMENTS 64-27563 2/1989 Japan .

Primary Examiner—Dirk Wright
Attorney, Agent, or Firm—Foley & Lardner

[57] ABSTRACT

A traction drive transmission comprises a shift control valve. The shift control valve serves also as a lock-up inhibitor valve establishes a fluid communication whereby a lock-up mechanism of a hydrodynamic unit is held at a lock-up release state.

4 Claims, 5 Drawing Sheets

TRACTION DRIVE TRANSMISSION AND LOCK-UP CONTROL

BACKGROUND OF THE INVENTION

The present invention relates to a traction drive transmission and more particularly to a hydraulic control system performing a lock-up control and a shift control.

Japanese Utility Model Application First (unexamined) Publication No. 64-27563 discloses a hydraulic control system performing a lock-up control and a shift control of a traction drive transmission. For the lock-up control, a lock-up solenoid and a lock-up control valve are arranged, and for the shift control, a shift control valve and a stepper motor for the shift control valve are arranged. According to the hydraulic control system, the lock-up control is performed via the lock-up solenoid under the control of a control unit and the shift control is performed via the stepper motor under the control of the control unit. This known hydraulic control system involves a potential problem that if the lock-up solenoid should malfunction, a lock-up mechanism might be kept in its lock-up state, causing an engine stall at low vehicle speeds.

An object of the present invention is to improve the hydraulic control system such that the lock-up mechanism is held to a lock-up release state to prevent the above-mentioned potential problem.

SUMMARY OF THE INVENTION

According to the present invention thee is provided a control system for a transmission including a hydrodynamic torque transmitting unit with a lock-up mechanism having a lock-up state and a lock-up release state, the control system comprising:

a ratio control means for controlling a reduction ratio established in the continuously variable drive mechanism, said ratio control means including a shift control valve; and a lock-up control means for controlling the lock-up mechanism;

wherein said shift control valve includes a valve means for establishing a fluid communication whereby the lock-up mechanism is held to the lock-up release state.

DETAILED DESCRIPTION OF THE INVENTION

Figure 1:
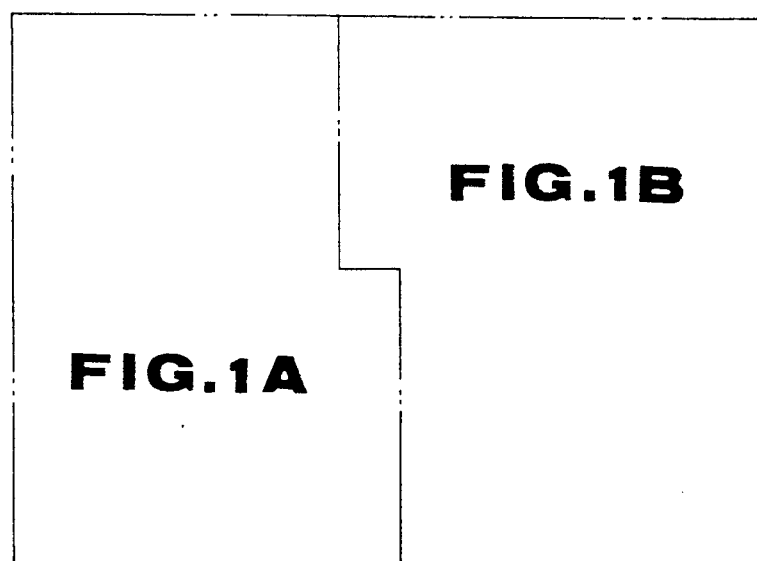
FIG. 1 is a view combining FIG. 1A with FIG. 1B.
Figure 1A:
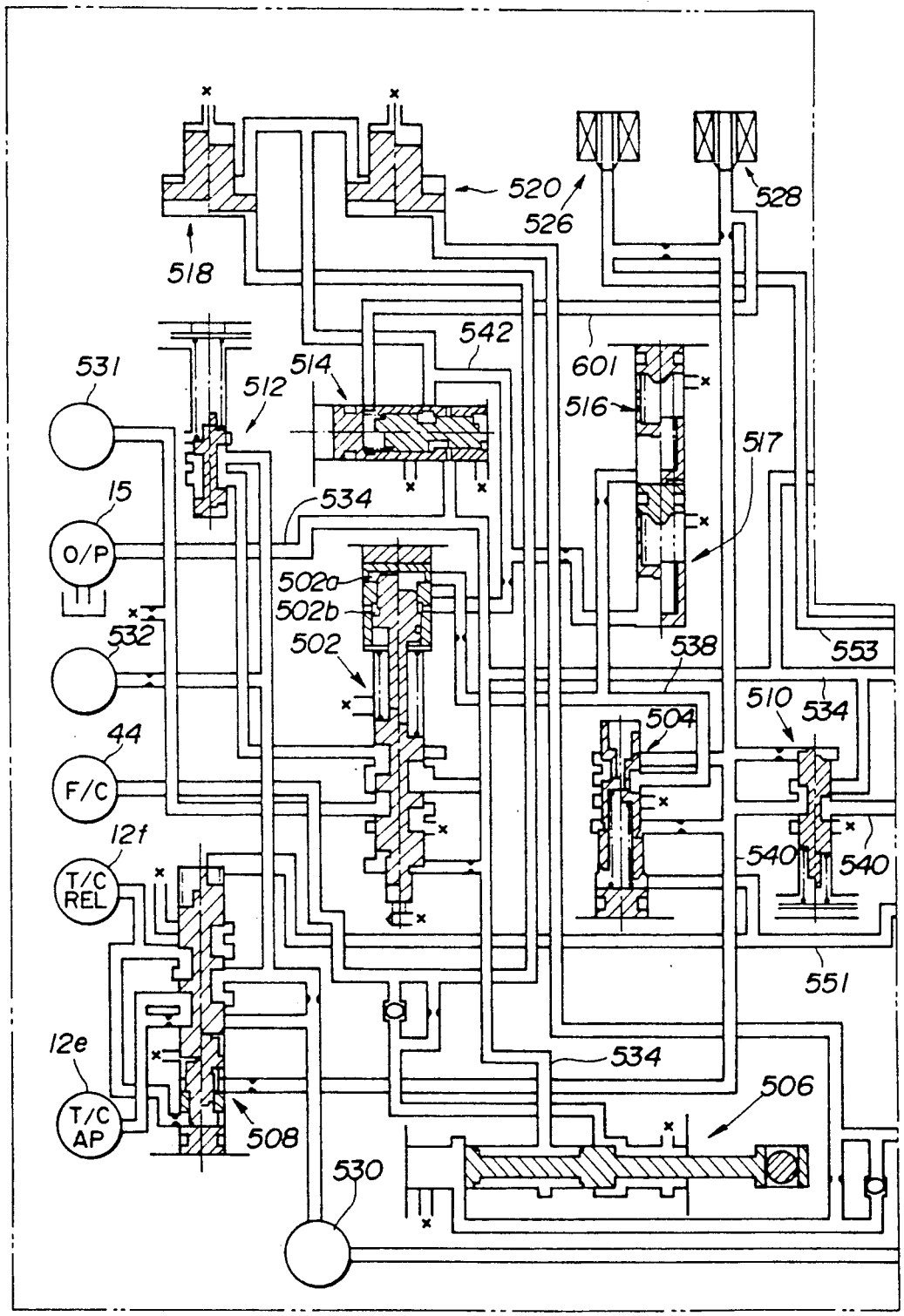
FIGS. 1A and 1B, when combined, is a hydraulic control system for a traction drive transmission employing a half-toroidal dual-cavity traction drive system.
Figure 1B:
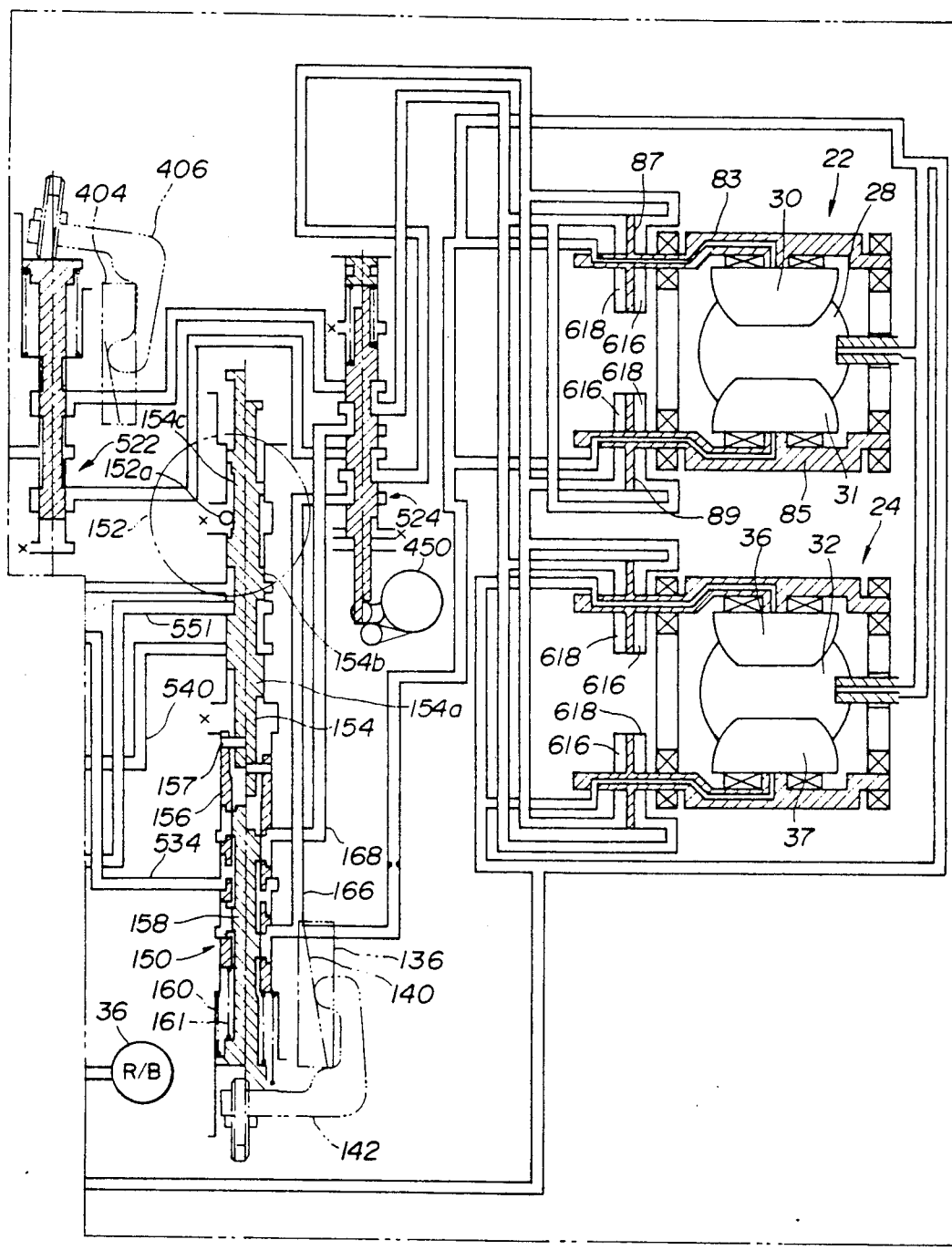
Figure 2:
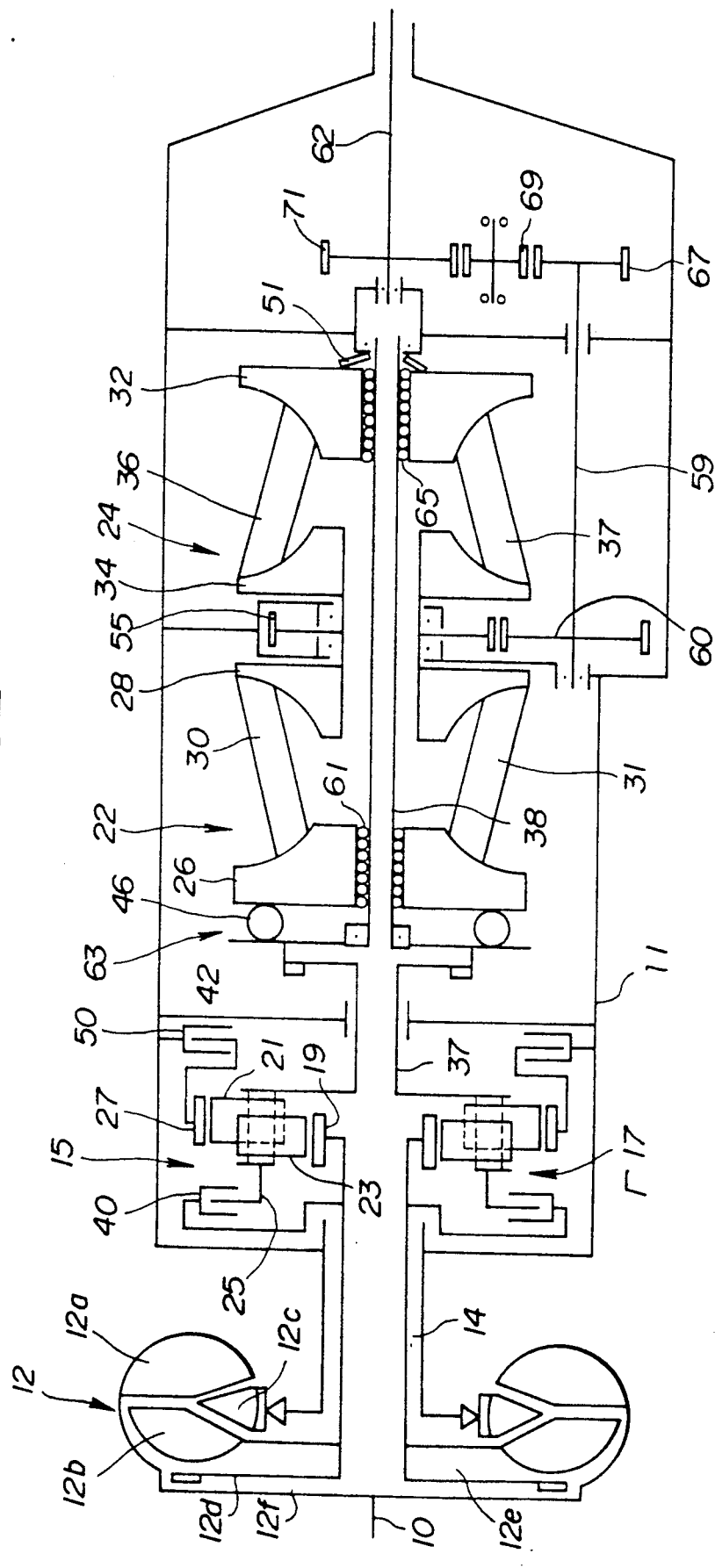
FIG. 2 is a schematic view of the transmission.

Referring to FIGS. 1A, 1B, 2 and 3, a first embodiment is explained below. Referring to FIG. 2, the traction drive transmission includes a hydrodynamic torque transmitting unit in the form of a torque converter 12 with a lock-up mechanism in the form of a lock-up clutch 12d, a forward reverse change-over mechanism 15, and a half-toroidal dual-cavity traction drive system 22, 24.

The torque converter 12 includes a pump impeller 12a, a turbine runner 12b, a stator 12b and the above-mentioned lock-up clutch 12d. In a lock-up state, the lock-up clutch 12d mechanically connects the pump impeller 12a to the turbine runner 12b, while in a lock-up release state, the lock-up clutch 12d is disengaged to interrupt the mechanical connection. The lock-up clutch 12d is engaged or disengaged in response to a difference between pressures in an apply side chamber 12e and a release side chamber 12f. The pump impeller 12a is rotatable with an engine output shaft 10, while the turbine runner 12b is rotatable with a turbine shaft 14 connected to the forward reverse change-over mechanism 15.

The forward reverse change-over mechanism 15 includes a dual-pinion planetary gear set 17, a forward clutch 40, and a reverse brake 50. The planetary gear set 17 comprises a sun gear 19, a plurality of pairs of intermeshed dual pinions 21, 23 rotatably supported on a pinion carrier 25, and a ring gear 27. The sun gear 19 is rotatable with the turbine shaft 14. The pinion carrier 25 is connectable via the forward clutch 40 to the turbine shaft 14. The ring gear 27 is adapted to be held stationary to a casing 11 by the reverse brake 50. The pinion carrier 25 is rotatable with an input shaft 37 of the half-toroidal dual-cavity traction drive system 22, 24.

The half-toroidal dual-cavity traction drive system includes a first change-speed mechanism 22 and a second change-speed mechanism 24. The first change-speed mechanism 22 has a set of coaxial input and output discs 26, 28 having facing toric surfaces and a pair of friction rollers 30, 31 disposed between and in driving contact with the torric surfaces for transmitting torque between the input and output discs 26, 28. Similarly, the second change-speed mechanism 24 has a set of coaxial input and output discs 32, 34 having facing toric surfaces and a pair of friction rollers 36, 37 disposed between and in driving contact with the toric surfaces for transmitting torque between the input and output discs 32, 34. The input disc 26 is supported on an intermediate shaft 38 by way of a ball spline 61. The intermediate shaft 38 is rotatable with the input shaft 37. A cam flange 42 is arranged on the back side of the input disc 24. Between facing cam surfaces of the cam flange 42 and the back of the input disc 26 are arranged cam rollers 46. The cam flange 42, input disc 26 and cam rollers 46 form a loading cam 63. The input disc 32 of the second change-speed mechanism 23 is supported on the intermediate shaft 37 by way of a ball spline 65. A disc spring 51 is arranged to bias the input disc 32 toward the output disc 34. The output discs 28 and 34 are rotatably supported on the intermediate shaft 38.

A drive from the output discs 28 and 34. is transmitted to a drive gear 55 which meshes with a follower gear 60 of a counter shaft 59. This shaft 59 has a gear 67 meshing an idler gear 69 which in turn meshes with a gear 71 of an output shaft 62.

Referring to FIGS. 1A and 1B, the hydraulic control system is explained below.

This hydraulic control system comprises the following parts:

A shift control valve 150;
A line pressure regulator valve 502;
A manual valve 506;
A lock-up control valve 508;
A pilot pressure valve 510;

A pressure modifier valve 504;
A relief valve 512;
An accumulator control valve 514;
An accumulator 516;
An accumulator 517;
A forward clutch accumulator 518;
A reverse brake accumulator 520;
A reverse synchronizing valve 522;
A forward reverse change-over valve 524;
A lock-up solenoid 526; and
A line pressure solenoid 528.

In FIG. 1B, servo motors for the first and second change-speed mechanisms 22, 24 are diagrmmatically illustrated. Roller carriers 83 and 85 for the friction rollers 30 and 31 of the first change-speed mechanism 22 are rotatable and axially movable. The roller carriers 83 and 85 are connected to pistons 87 and 89, respectively. On the both sides of each of the pistons 87 and 89 are formed a high side or upshift side servo chamber 616 and a low side or downshift side servo chamber 618. The structure of the servo motors for the second change-speed mechanism 24 is substantially the same as the first change-speed mechanism 22.

The line pressure regulator valve 502 effects pressure regulation to adjust a pressure within a line pressure conduit 534 leading from an oil pump 15 at an adjusted pressure, i.e., a line pressure. The pressure modifier valve 504 adjusts the hydraulic pressure within a conduit 538 in response to an operating state of the lock-up solenoid 526. The hydraulic pressure adjusted by the pressure modifier valve 504 is supplied via the conduit 538 to the line pressure regulator valve 502. The manual valve 506 selectively supplies the line pressure from the conduit 534 to the forward clutch 44 or the reverse brake 36. The lock-up control valve 508 controls the state of the lock-up clutch 12d response to a signal pressure supplied thereto through a signal pressure concuit 551. This signal pressure concuit 551 is selectively connected to a solenoid pressure conduit 553 comming from the lock-up solenoid 526 or a pilot pressure conduit 540 comming from the pilot pressure valve 510. The pilot pressure valve 510 generates a constant hydraulic pressure as the pilot pressure. The pilot pressure is supplied through the pilot pressure conduit 540 to the valve 150 and through the conduit 540 to the lock-up solenoid 526 and line pressure solenoid 528.

The relationship between a stepper motor 152 and the shift control valve 150 is described below.

In FIG. 1B, the shift control valve 150 comprises a rod 154, a sleeve 156 and a spool 158 slidably disposed in the sleeve 156. The spool 158 and the rod 154 are slidably disposed within the same valve bore in axially spaced relationship. The rod 154 is formed with a rack 154c which meshes a pinion 152a of the stepper motor 152. The rod 154 has one end portion disposed in the sleeve 156 and joined thereto by a radial pin 157 and a radial elongate hole 156a as best seen in FIG. 3.

Figure 3:
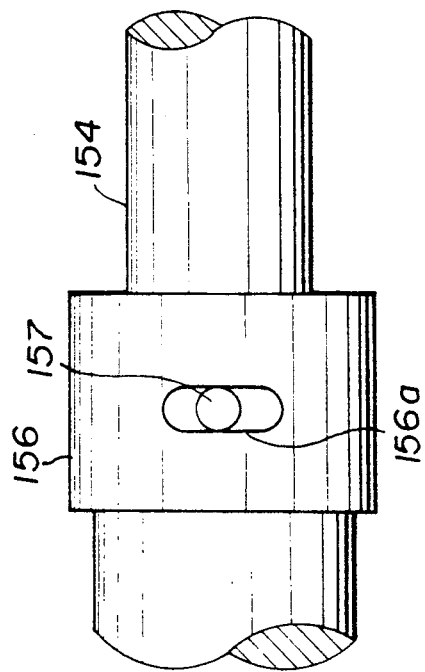
FIG. 3 is an enlarged fragmentary perspective view of a. valve employing one form of a joint between a sleeve and a rod.

Referring to FIG. 3, the radial pin 157 of the rod 154 is received in the radial elongate hole 156a of the sleeve 156. In order to eliminate clearance in an axial direction between the sleeve 156 and the rod 154, a spring 161 is disposed between the spool 158 and the sleeve 156 to bias the sleeve 156 toward the rod 154. Owing to this joint consituted by the pin 157 and hole 156a, the sleeve 156 moves in unision with the rod 154 in the axial direction, but displacement of the sleeve 156 relative to the rod 154 in a radial direction or a rotational direction is allowed. Thus, no great force is applied between them, eliminating or at least reducing the possibility of occurrence of a so-called valve stick phenomena.

Arranged around the spring 161 is a spring 160 which biases the spool 158 toward a lever or link 142. Owing to this spring 160, the spool 158 can follow movement of one end portion of the level 142. The opposite end the lever 142 rests on a cam face 140 of a rotary precess cam 136. The precess cam 136 is connected to one of friction roller carriers for unitary rotation therewith. Owing to this precess cam 136 and the lever 142 which serves as a cam follower, a rotational motion of the roller carier due to inclination of the friction roller supported by the roller carrier is converted into an axial displacement of the spool 158. In a stable state when the maximum reduction ratio is established, the rod 154, sleeve 156 and spool 158 assume positions as illustrated by the right halves thereof, respectively, viewing in FIG. 1B. In another stable state when the minimum reduction ratio is established, the rod 154, sleeve 156 and spool 158 assume positions as illustrated by the left halves thereof, respectively, viewing in FIG. 1B. As will be seen from FIG. 1B, the spool 158 assumes a predetermined relationship with the sleeve 156 in each of the above-mentioned two stable states. If the sleeve 156 is moved from the position corresponding to the maximum reduction ratio to any position owing to movement of the rod 154 by the stepper motor 152, the spool 158 remains in the original position determined by the position of the lever 142, allowing supply of hydraulic fluid to the upshift servo chambers 616 via a hydraulic fluid conduit 166 and discharge of hydraulic fluid from downshift servo chambers 618 via a hydraulic fluid conduit. This fluid communication is established when the forward reverse change-over valve 524 assumes a forward position as illustrated by the right half thereof viewing in FIG. 1B. Owing to the pressure differential created, each of the roller units 22 and 24 incline, causing the presess cam 136 to rotate in such a direction as to swing the lever 142 clockwise, viewing in FIG. 1B. This clockwise movement of the lever 142 causes the spool 158 to move toward the predetermined relation with the sleeve 156. From the above explanation, it will be appreciated that the rod 154, sleeve 156 and spool 158 cooperate with each other to serves as a shift control valve of a ratio control system.

The rod 154 is provided with two axially spaced lands 154a and 154b which define therebetween grooves serving as a transfer passage. This transfer passage between the lands 154a and 154b selectively connects the signal pressure conduit 551 leading to the lock-up control valve 508 to the pilot pressure conduit 540 coming from the pilot pressure valve 510 or the solenoid pressure conduit 553 coming from the lock-up solenoid 526 depending upon the position of the rod 154. When the rod 154 is in the position as illustrated by the right half thereof viewing in FIG. 1B, the spool 158 and sleeve 156 of the shift control valve cooperate with each other to provide the maximum redution ratio, the transfer passage between the lands 154a and 154b establishes fluid communication between the pilot pressure conduit 540 and the signal pressure conduit 551, but blocking fluid communication between the signal pressure conduit 551 and the solenoid pressure conduit. Under this condition, the constant pilot pressure from the pilot pressure valve 510 is supplied to the lock-up control valve 508, holding the lock-up control valve to a lock-up release postion corresponding to a lock-up release state of the lock-up mechanism 12d of the torque converter 12. This condition is kept established during movement of the rod 154 from the maximum reduction ratio corresponding position to a predetermined position corresponding to a reduction ratio near the maximum reduction ratio. During movement of the rod 154 beyond this predetermined position to the minimum reduction ratio corresponding position as illustrated by the left half thereof viewing in FIG. 1B, the transfer passage between the lands 154a and 154b blocks the fluid communication between the signal pressure conduit 551 and the pilot pressure conduit 540 and establishes the fluid communication between the signal pressure conduit 551 and the solenoid pressure conduit 553. Thus, during this movement of the rod 154, the lock-up control valve 508 is supplied with the solenoid pressure from the lock-up solenoid 526 under the control of a control unit, not shown. However, during movement of the rod 154 between the predetermined position and the maximum reduction ratio corresponding position, the pilot pressure is supplied to the lock-up control valve 508 to hold the lock-up mechanism 12d to the lock-up release state. Since the pilot pressure is used as a source pressure to generate the solenoid pressure by the lock-up solenoid 526, the solenoid pressure in the conduit 553 is equal to or lower than the pilot pressure within the conduit 551.

From the preceeding description, it will now be appreciated that the lands 154a and 154b cooperate with ports of the conduits 551, 553 and 540 to serve as a lock-up inhibitior valve.

According to this lock-up inhbiting function performed, the lock-up mechanism is held at the lock-up release state during the stroke of the rod 154 between the predetermined position and the maximum reduction ratio position, eliminating the possibility of engine stall at low vehicle speed which otherwise might occur due to undesired establishment of the lock-up state by malfunction of the lock-up solenoid.

Figure 4:
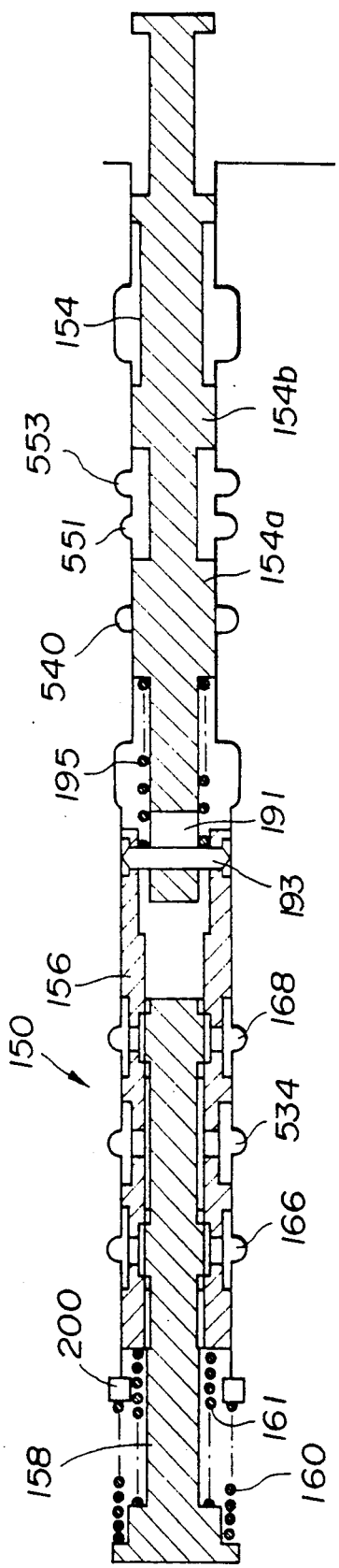
FIG. 4 is a longitudinal section of a valve employing a second form of a joint between a sleeve and a rod of a valve.

In the second embodiment illustrated in FIG. 4, a rod 154 is joined to a sleeve 156 such that a transfer passage defined between two lands 154a and 154b establishes a fluid communication between a signal pressure conduit 551 and a pilot pressure conduit 540 during overstroke movement of the rod 154 ibeyond the maximum reduction ratio corresponding position. For allowing such overstroke movement of the rod 154, the rod 154 is formed with a longitudinal elongate hole 191 and a lateral pin 193 of a sleeve 156 passes through the elongate hole 191. In order to provide motion transmitting function, a spring 195 is disposed between the pin 193 of the sleeve 156 and a shoulder of the rod 154. A stop 200 is provided which defines the maximum reduction ratio corresponding position of the sleeve 156.

According to this second embodiment, a longitudinal unitary motion of the sleeve 156 with the rod 154 during a normal stroke movement of the rod 154 between the maximum reduction ratio position and the minimum reduction ratio position owing to the spring 195. During this normal stroke movement of the rod 154, the fluid communication between the signal pressure conduit 551 and the pilot pressure conduit 540 is blocked and fluid communication between the signal pressure conduit 551 and the solenoid pressure conduit 553 is established. If the sleeve 156 is engaged by the stop 200 to assume the maximum reduction ratio corresponding position, further movement of the rod 154 into the overstroke range beyond the maximum reduction ratio position is allowed until the opposite end of the elongate hole 191 abuts the pin 193. During this movement, the motion transmitting spring 195 is compressed.

From the preceding description of the embodiments, it will now be appreciated that the lock-up mechanism is held to the lock-up release state regardless of the operation of the lock-up solenoid by way of movement of the rod 154.

What is claimed is:

1. A control system for a transmission including a hydrodynamic torque transmitting unit with a lock-up mechanism having a lock-up state and a lock-up release state, the control system comprising:

a ratio control means for controlling a reduction ratio established in a continuously variable drive mechanism, said ratio control means including a shift control valve; and a lock-up control means for controlling the lock-up mechanism;

wherein said shift control valve includes a valve means for establishing a fluid communication whereby the lock-up mechanism is held to the lock-up release state.

2. A control system as claimed in claim 1, wherein said shift control valve includes a pair of relatively movable valve elements, a rod and a joint means for mechanically connecting said rod to one of said relatively movable elements, and wherein said valve means cooperates with said rod such that said fluid communication is established in response to movement of said rod.

3. A control system as claimed in claim 2, wherein said joint means includes a pin and hole connection means for connecting said rod to said one valve element such that said one valve element of said shift control valve is movable in unision with said rod in an axial direction with a limited relative displacement.

4. A control system as claimed in claim 2, wherein said joint means includes a spring disposed between said rod and said one valve element such that said spring provides a positive motion transmission therebetween.

* * * * *